US011034426B2

(12) United States Patent
Liang et al.

(10) Patent No.: US 11,034,426 B2
(45) Date of Patent: Jun. 15, 2021

(54) UNDERWATER PROPULSION APPARATUS WITH FAILSAFE FEATURES, CONTROL SYSTEM, AND METHOD THEREOF

(71) Applicant: Guangdong ePropulsion Technology Limited, Dongguan (CN)

(72) Inventors: Guo-Jian Liang, Dongguan (CN); Zhi-Zhou Wei, Dongguan (CN); Yan-Li Zhong, Dongguan (CN); Shi-Zheng Tao, Dongguan (CN); Xiao-Kang Wan, Dongguan (CN)

(73) Assignee: Guangdong ePropulsion Technology Limited, Dongguan (CN)

( * ) Notice: Subject to any disclaimer, the term of this patent is extended or adjusted under 35 U.S.C. 154(b) by 0 days.

(21) Appl. No.: 16/519,229

(22) Filed: Jul. 23, 2019

(65) Prior Publication Data

US 2019/0344874 A1    Nov. 14, 2019

Related U.S. Application Data

(63) Continuation-in-part of application No. PCT/CN2017/099240, filed on Aug. 28, 2017.

(30) Foreign Application Priority Data

Jan. 23, 2017  (CN) .......................... 201710051263.9

(51) Int. Cl.
*B63B 32/10* (2020.01)
*B63H 21/21* (2006.01)

(52) U.S. Cl.
CPC ............. *B63H 21/21* (2013.01); *B63B 32/10* (2020.02); *B63H 2021/216* (2013.01)

(58) Field of Classification Search
CPC .............. B63B 32/10; B63B 2035/008; B63G 2008/007; B63G 2008/005
See application file for complete search history.

(56) References Cited

U.S. PATENT DOCUMENTS

| 2003/0167991 A1* | 9/2003 | Namanny | ............... B63B 32/60 |
| | | | 114/55.56 |
| 2004/0083940 A1* | 5/2004 | Shelton | .................. B63G 8/001 |
| | | | 114/312 |

(Continued)

FOREIGN PATENT DOCUMENTS

| CN | 203593146 U | 5/2014 |
| CN | 203965941 U | 11/2014 |

(Continued)

*Primary Examiner* — Andrew Polay
(74) *Attorney, Agent, or Firm* — ScienBiziP, P.C.

(57) ABSTRACT

An underwater propulsion apparatus includes a motor and a control system for controlling the motor. The control system includes a remote controller and a motor driving device, wirelessly communicating with the remote controller. The motor driving device includes a communication repeater module and a motor driving module. The communication repeater module is configured for detecting interruptions or non-receipt of a wireless signal transmitted by the remote controller. Wireless signals to the motor driving module are transmitted by the remote controller to the communication repeater module. The motor driving module is configured for receiving the wireless signal, and outputs a driving signal for driving the motor according to the wireless signal, the motor driving module shutting down when no signal is received.

19 Claims, 6 Drawing Sheets

(56) References Cited

U.S. PATENT DOCUMENTS

| | | | |
|---|---|---|---|
| 2008/0122655 A1 | 5/2008 | Aqualiv | |
| 2018/0099734 A1* | 4/2018 | Schibli | B63B 32/10 |
| 2018/0170499 A1* | 6/2018 | Terada | G06F 3/017 |
| 2018/0293881 A1* | 10/2018 | Leason | G01D 5/145 |

FOREIGN PATENT DOCUMENTS

| | | |
|---|---|---|
| WO | 9739924 | 10/1997 |
| WO | 2004007276 | 1/2004 |

* cited by examiner

UNDERWATER PROPULSION APPARATUS WITH FAILSAFE FEATURES, CONTROL SYSTEM, AND METHOD THEREOF

CROSS-REFERENCE TO RELATED APPLICATIONS

This application is a continuation in part of PCT Patent Application with Serial Number PCT/CN2017/099240, filed on Aug. 28, 2017, which claims priority to CN Patent Application with Serial Number CN201710051263.9 filed on Jan. 23, 2017, the disclosure of which is incorporated herein by reference.

FIELD

The subject matter herein generally relates to underwater propulsion apparatus, and particularly to a motorized underwater propulsion device for watercrafts and a control system and method thereof.

BACKGROUND

Small watercrafts such as a canoes, rubber boats, dinghies, rafts, kayaks, sailboats, fishing boats, stand-up boards or the like are commonly equipped with a power device to drive in water. Such a power device is usually called an underwater propulsion apparatus, generally the underwater propulsion apparatus is small power due to the fact that it is motorized with a remote controller for controlling the power, and using battery to supply power. In addition, a typical underwater propulsion apparatus for watercrafts usually uses a throttle that is directly connected to the underwater propulsion apparatus to control the power of the underwater propulsion apparatus, which requires an extra particular fixing mechanism on a particular carrier to assemble the throttle to the underwater propulsion apparatus and lead to complex structures of the underwater propulsion apparatus.

In a small size of boat, a passenger can easily fall into water. If a passenger falls into the water, and the underwater propulsion apparatus is not powered off timely it will be dangerous. The fallen passenger is under risk of hurting by the underwater propulsion apparatus, furthermore collisions may damage the underwater propulsion apparatus itself.

DETAILED DESCRIPTION

Drawings of the embodiments of the present disclosure are to be referred to with the described embodiments. The embodiments of the present disclosure are not all of the embodiments. Based on the embodiments of the present disclosure, all other embodiments obtained by those ordinarily skilled in the art without creative work fall within the protection scope of the present disclosure.

When one component is considered to "couple" another component, it may be directly connected to the other component or it is possible that there is a third component between them.

Unless otherwise defined, all the technical and scientific terms used in this specification convey the same meanings as the meanings commonly understood by a person skilled in the art. Additionally, the terms used in the specification the present disclosure are merely for describing the objective of the specific embodiments, and are not intended to limit the present disclosure. The term "and/or," includes any and all combinations of one or more of the associated listed items.

Figure 1:
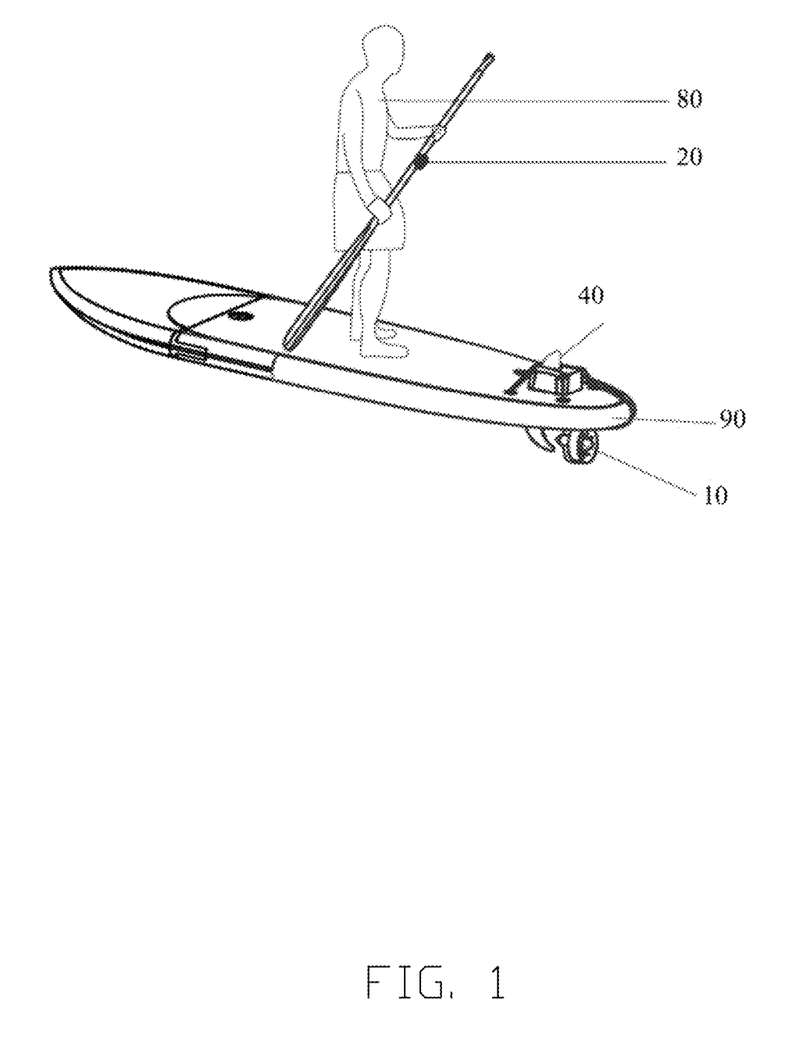
FIG. 1 is a schematic view of one embodiment of an underwater propulsion apparatus assembled to a boat.

FIG. 1 illustrates one embodiment of an underwater propulsion apparatus (underwater propulsion apparatus 10) assembled to a boat. When the underwater propulsion apparatus 10 is assembled to the boat 90, in an orientation as shown in FIG. 1, the underwater propulsion apparatus 10 is positioned at a bottom portion of the boat 90. When the boat 90 is in the water, the underwater propulsion apparatus 10 operates underwater and provides motive power to the boat 90. In this embodiment, the boat 90 includes a control system for the underwater propulsion apparatus 10. The control system includes a remote controller 20 and a motor driving device 30. The remote controller 20 is connected to the motor driving device 30 by wireless communication. The remote controller 20 is configured for transmitting a wireless signal to the motor driving device 30. The motor driving device 30 is configured for outputting a driving signal to drive a motor (e.g. a motor 220 shown in FIG. 2) of the boat 90 according to the wireless signal. The boat 90 can include a paddle as well as a propeller included in the underwater propulsion apparatus 10. The remote controller 20 can be carried by a user 80, and also can be assembled to the paddle or in other suitable position of the boat 90.

Figure 2:
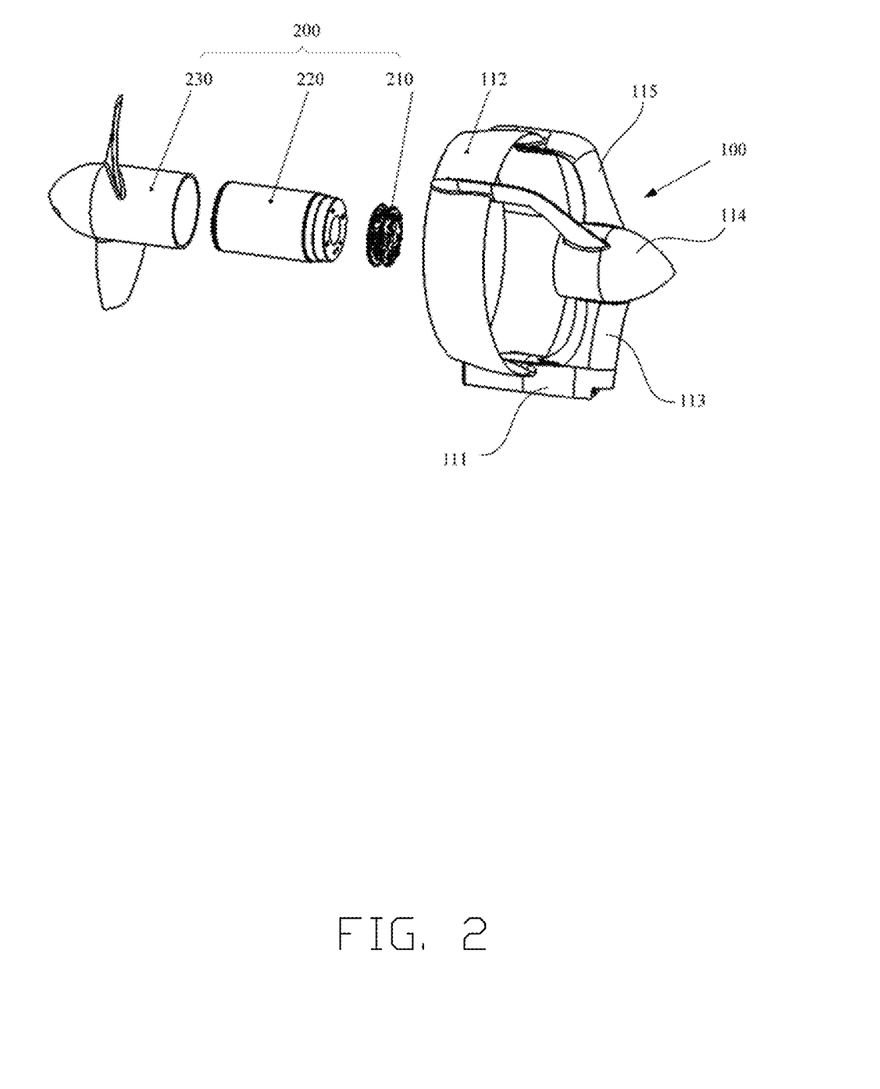
FIG. 2 is a view of the underwater propulsion apparatus of FIG. 1 when demounted.

FIG. 2 shows the underwater propulsion apparatus 10 of FIG. 1 disassembled. The underwater propulsion apparatus 10 includes a main supporter 100 and a power output structure 200 assembled to the main supporter 100.

In an embodiment, the main supporter 100 includes a base 111, a frame 112, a supporting arm 113, and a head 114. The frame 112 is substantially annular. The frame 112 is fixed on the base 111. The supporting arm 113 extends from the base 111 toward the head 114. The head 114 is substantially cylindrical. The head 114 is fixed on an end of the supporting arm 113 opposite to the base 111 and positioned at a central axis of the frame 112. In this embodiment, the main supporter 100 further includes a plurality of fixing arms 115 configured for connecting the head 114 and the frame 112. In this embodiment, a number of the fixing arms 115 is three, and the number of the fixing arms 115 can be changed according to the requirements. The fixing arms 115 extend from the head 114 radially and connect to the frame 112.

The power output structure 200 includes a driving board 210, a motor 220, and a propeller 230 connected in sequence. The driving board 210 is a circuit board assembly configured for controlling the motor 220. The motor 220 is configured for driving the propeller 230 to rotate under the control of the driving board 210, thereby providing propulsion to the boat 90.

Figure 3:
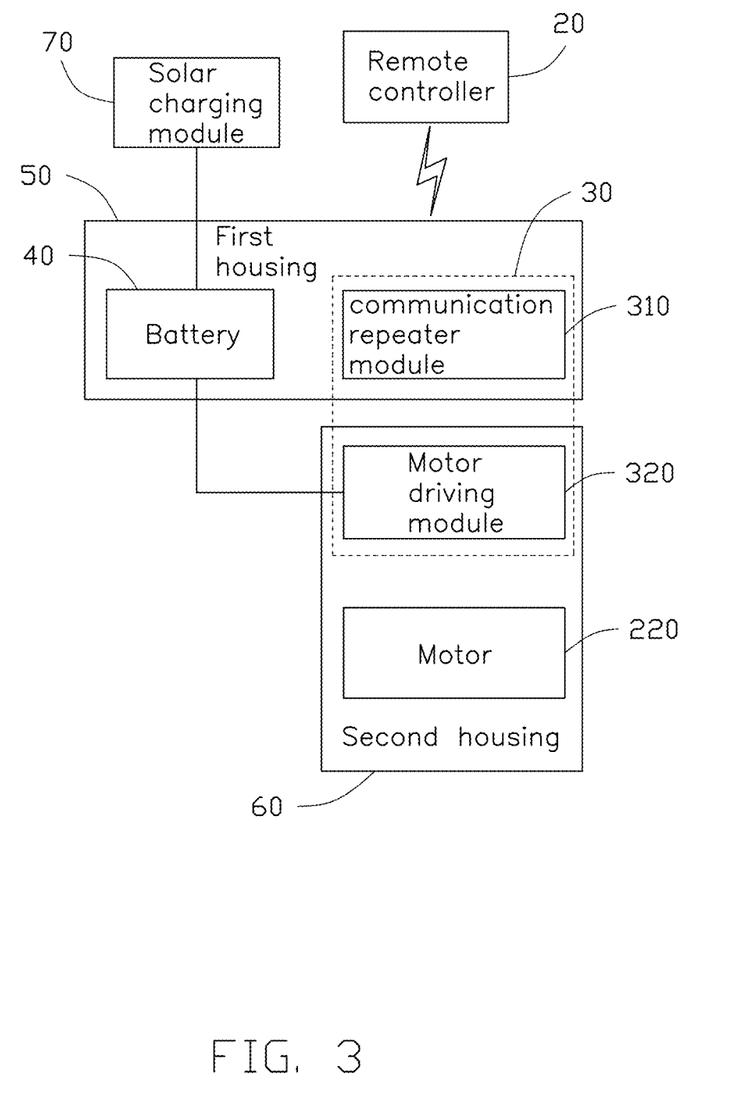
FIG. 3 is a block diagram of one embodiment of a control system of the underwater propulsion apparatus of FIG. 1.

Referring to FIG. 3, the remote controller 20 is wirelessly connected to the motor driving device 30 for transmitting a wireless signal to the motor driving device 30. The motor driving device 30 is configured for outputting the driving signal to drive the motor 220 according to the wireless signal. In an embodiment, the motor driving device 30 can include a communication repeater module 310 and a motor driving module 320. The communication repeater module 310 is connected to the remote controller 20 by a wireless communication connection. The communication repeater module 310 is configured for detecting whether a wireless signal is transmitted by the remote controller 20, and for receiving and forwarding the wireless signal to the motor driving module 320 when the remote controller 20 transmits the wireless signal to the communication repeater module 310. The motor driving module 320 is connected to the communication repeater module 310 for receiving the wireless signal, and outputs the driving signal for driving the motor 220 according to the wireless signal. When the motor driving module 320 ceases receiving the wireless signal from the communication repeater module 310, the motor driving module 320 controls the motor 220 to shut down (i.e. stop rotating the propeller 230).

When the remote controller 20 drives the motor 220 to operate (i.e. rotate the propeller 230) by the motor driving device 30, the remote controller 20 transmits the wireless signal to the motor driving device 30 at a predetermined time interval. The remote controller 20 is generally carried by the user 80 or assembled to the paddle held by a user depending on more convenient remote control for the user. The communication repeater module 310 can detect whether there is a communication failure between the remote controller 20 and the motor driving device 30 (e.g. the wireless connection between the remote controller 20 and the motor driving device 30 is disconnected, or too weak) which is continued for a certain period of time, such as one second, or three seconds, or whether the wireless signal transmitted by the remote controller 20 is not received for a certain period of time, thereby determining whether the remote controller 20 is beyond a preset range or falls into the water. When the remote controller 20 falls into the water, the wireless signal in the water will attenuate, and the motor driving device 30 will not receive the wireless signal from the remote controller 20. Thus, the motor driving device 30 can determine that the remote controller 20 has fallen into water, and control the motor 220 to power off.

Therefore, when the remote controller 20 or the user 80 holding it falls into water, the motor driving device 30 of the above-mentioned control system can timely control the motor 220 to power off, thereby avoiding injury to someone in the water and protecting the underwater propulsion apparatus 10 and the boat 90 from collision with the person. In other embodiment, the control system can further include a battery 40. The battery 40 is electrically connected to the communication repeater module 310 and the motor driving module 320, respectively. The battery 40 is configured for providing a first voltage (e.g. about 5V) for the communication repeater module 310, and also for providing a second voltage (e.g. about 24V) for the motor driving module 320. In other embodiment, the control system can further include a solar charging module 70. The solar charging module 70 is electrically connected to the battery 40. The solar charging module 70 is configured for charging the battery module 40 by solar energy.

The battery 40 is wired to the communication repeater module 310, the motor driving module 320, and the motor 220, and configured for supplying power to the communication repeater module 310, the motor driving module 320, and the motor 220. The communication repeater module 310 is positioned above the water and wirelessly communicates with the remote controller 20. The motor driving module 320 can be positioned above the water or underwater. When the motor driving module 320 is positioned above the water, the communication repeater module 310 and the motor driving module 320 can be wired or wirelessly connected, and the motor driving module 320 and the motor 220 are wired connected. When the motor driving module 320 is positioned underwater, the communication repeater module 310 and the motor driving module 320 are wired connected, and the motor driving module 320 and the motor 220 are wired connected too.

Each of the battery module 40, the communication repeater module 310, the motor driving module 320, and the motor 220 can be independently and separately assembled into a protective housing or combined in different protective housings.

In an embodiment, the battery module 40 and the communication repeater module 310 are received and assembled into a first housing 50 together. The motor driving module 320 and the motor 220 are received and assembled into a second housing 60 (which can be the head 114 shown in FIG. 2). Generally, the first housing 50 is positioned on the boat 90 above the water, and the second housing 60 is positioned on the boat 90 underwater. The battery 40 is electrically connected to the motor driving module 320 positioned underwater by a positive wire and a negative wire passing through the first housing 50 and the second housing 60 for providing power to the motor driving module 320. The communication repeater module 310 is electrically connected to the motor driving module 320 by a communication line passing through the first housing 50 and the second housing 60. The motor driving module 320 can be positioned on the driving board 210 shown in FIG. 2. The first housing 50 and the second housing 60 may be sealed by using sealing ring or glue.

Since the wireless communication underwater can be affected by interference, the communication repeater module 310 wirelessly communicating with the remote controller 20 is positioned above the water, and also is wired connected to the motor driving module 320 positioned underwater. As such, signal transmission qualities and stability of communication between the communication repeater module 310, the remote controller 20, and the motor driving module 32 can be ensured. In addition, the battery 40 positioned above the water is also safe.

In other embodiment, the motor driving module 320 can also be positioned in the first housing 50 together with the battery 40, and then the motor driving module 320 and the motor 220 can be connected by a wire. Alternatively, the battery 40, the motor driving module 320, and the motor 220 can be independent of each other, rather than being centrally received and assembled into one housing.

Figure 4:
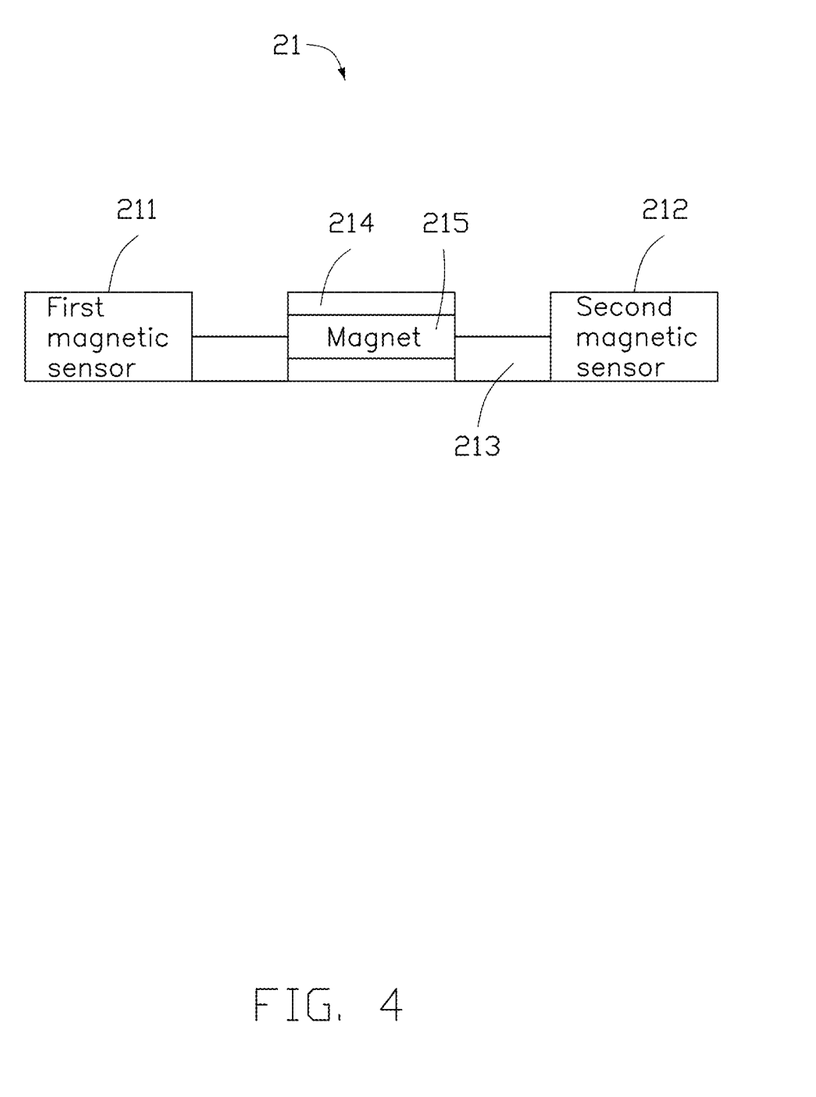
FIG. 4 is a schematic view of one embodiment of a magnetic field strength detecting unit of the underwater propulsion apparatus of FIG. 1.

FIG. 4 shows one embodiment of a magnetic field strength detecting unit of the underwater propulsion apparatus of FIG. 1. The remote controller 20 can further include a magnetic field strength detecting unit 21. In this embodiment, the magnetic field strength detecting unit includes a first magnetic sensor 211, a second magnetic sensor 212, a sliding rail 213, a sliding block 214, and a magnet 215. The first magnetic sensor 211 and the second magnetic sensor 212 are spaced apart from each other. The sliding rail 213 is positioned between the first magnetic sensor 211 and the second magnetic sensor 212. In this embodiment, the sliding rail 213 defines a sliding slot. The sliding block 214 is slidably connected to the sliding rail 213 through the sliding slot. The magnet 215 is positioned on the sliding block 214.

When the underwater propulsion apparatus 10 is running, the battery 40 provides power for the operation of the underwater propulsion apparatus 10. The remote controller 20 obtains a magnetic field strength of the magnet 215 through the first and second magnetic sensors 211, 212, thereby calculating the wireless signal of the remote controller 20 for controlling the power of the motor 220, and transmitting the wireless signal to the communication repeater module 310 by means of the wireless communication connection. The communication repeater module 310 is further transmitted the wireless signal to the motor driving module 320 by the wire. The motor driving module 320 adjusts the power of the motor 220 based on the wireless signal.

The remote controller 20 further calculates a power control amount according to the detected magnetic field strength of the magnet 215. Meanwhile, for extending a length of a sliding distance of the magnet 215, the magnetic field strength is obtained by the dual sensors 211 and 212. The magnetic field strength between the two sensors 211, 212 can be changed by moving the sliding block 214.

In an embodiment, the remote controller 20 may further include a power management unit. The power management unit is configured for controlling the remote controller 20 to power off if the remote controller 20 does not receive a feedback signal of the communication repeater module 310 within a preset time for power saving. The power management unit includes a built-in battery configured for supplying electric power for the remote controller, the built-in battery is capable of being charged by a solar cell panel. In an embodiment, referring to FIG. 5, the communication repeater module 310 can include a first single chip microprocessor 311, a first trigger 312, and a diode D2. The motor driving module 320 can include a second single chip microprocessor 321 and a second trigger 322. The first single chip microprocessor 311, the first trigger 312, the diode D2, the second trigger 322, and the second single chip microprocessor 321 are connected in sequence. The first trigger 312 is connected to an anode of the diode D2, and the second trigger 322 is connected to a cathode of the diode D2.

Figure 5:
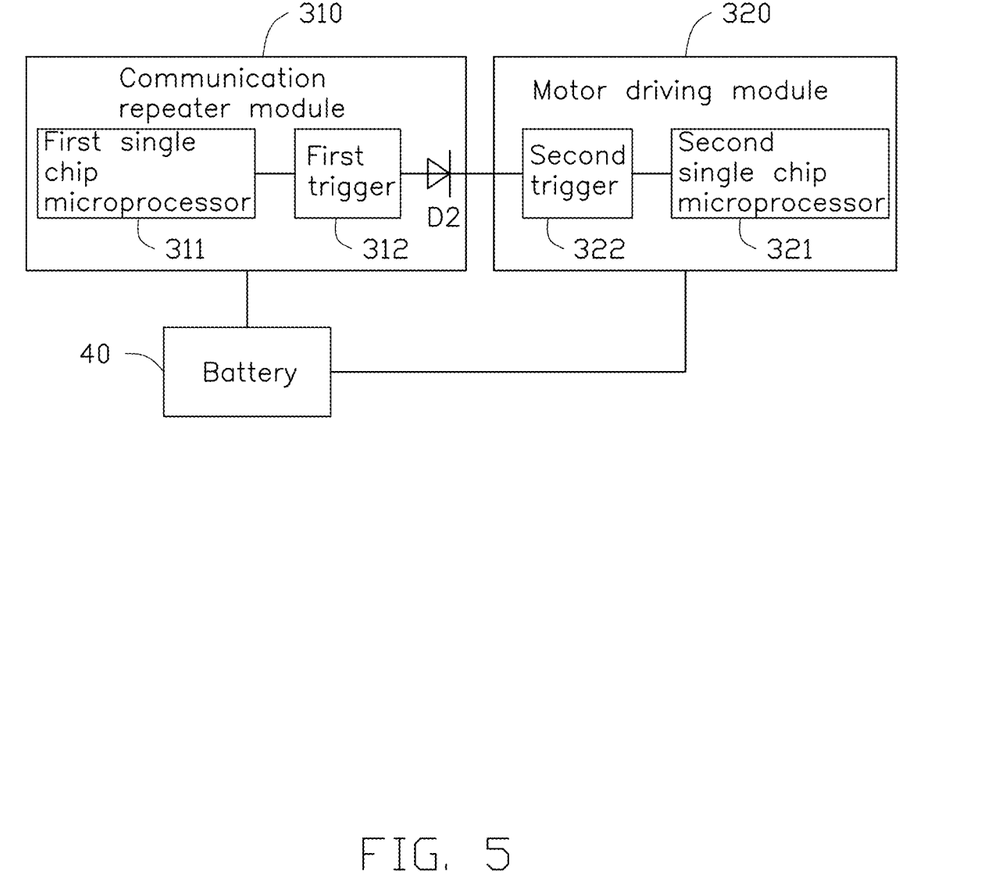
FIG. 5 is a block diagram of one embodiment of a motor driving device of the underwater propulsion apparatus of FIG. 1.

A length of each of the communication line, the battery positive electrode wire and the battery negative electrode wire generally reaches to 1.5 meters. Because of the long communication wire, if the first single chip microprocessor 311 and the second single chip microprocessor 321 are directly connected through the communication line when the motor 220 operates, the motor 220 will cause interference to a negative pole of the battery 40. That may cause an increase in a bit error rate in the way of single-line communication on every single line. In severe cases, the first single chip microprocessor 311 and the second single chip microprocessor 321 go to communicate failure. Therefore, the two triggers (i.e. the first trigger 312 and the second trigger 322) are added to the communication line to improve anti-interference capability in the single-line communication way.

In addition, if the negative wire between the battery 40 and the motor driving module 320 is disconnected before the positive wire between the battery 40 and the motor driving module 320 during plugging or unplugging a connector of the battery 40, since a voltage of a positive electrode of the battery 40 is about 24V, electric current will flow from the positive electrode of the battery 40 to a negative electrode of the battery 40 through the communication line. The communication repeater module 310 may be damaged because of the high voltage, which is beyond the maximum rated voltage (about 3.3V) of the first single chip microprocessor 311, the first trigger 312, the second single chip microprocessor 321, and the second trigger 322. By connecting the diode D2 in series with the communication line, even if the negative wire between the battery 40 and the motor driving module 320 is disconnected, the current cannot flow back to the negative electrode of the battery 40 through the communication line, thereby protecting each component from being damaged, and effectively improving a security of the system.

Figure 6:
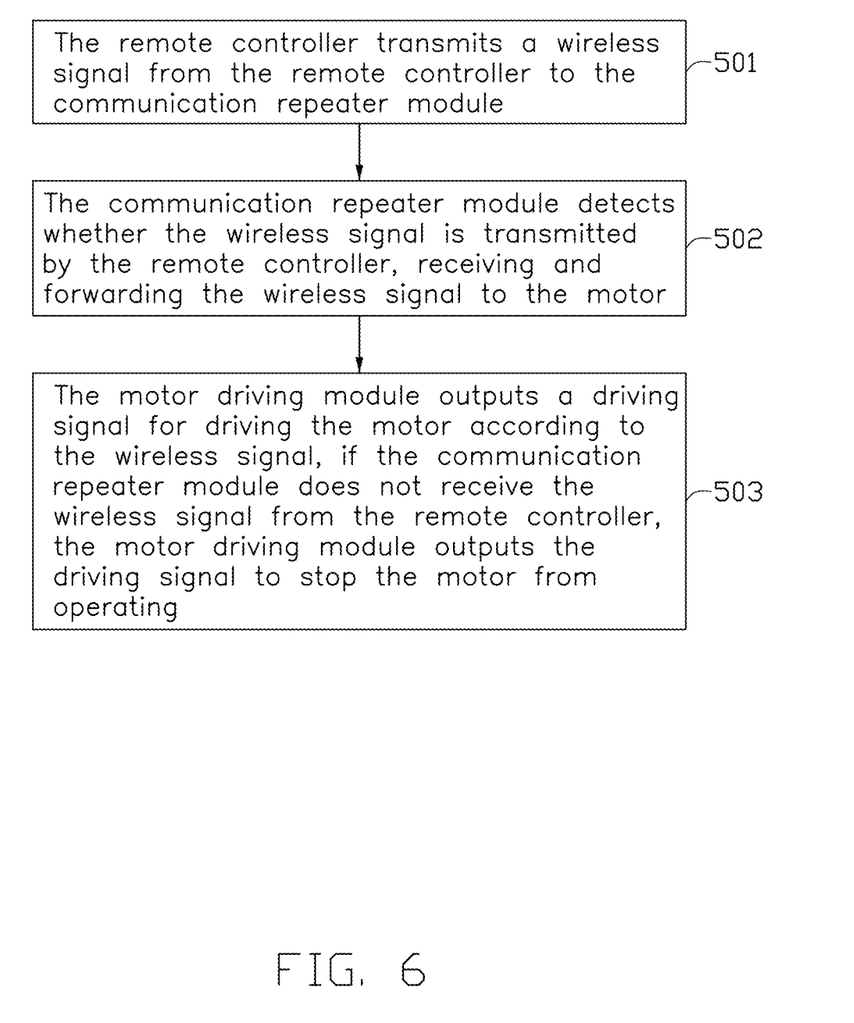
FIG. 6 is a flow chart of one embodiment of a method for controlling the underwater propulsion apparatus of FIG. 1.

Referring to FIG. 6, a method for controlling the underwater propulsion apparatus in one embodiment includes the following steps.

At block 501, the remote controller 20 transmits the wireless signal to the communication repeater module 310.

At block 502, the communication repeater module 310 detects whether a wireless signal is transmitted by the remote controller 20, and receives and forwards the wireless signal to the motor driving module 320 when the remote controller 20 transmits the wireless signal to the communication repeater module 310.

At block 503, the motor driving module 320 receives the wireless signal, and outputs the driving signal for driving the motor 220 according to the wireless signal. If the communication repeater module 310 does not receive the wireless signal from the remote controller 20, the motor driving module 320 outputs the signal to shut down the motor 220 or transmits a command to the battery 40 to power off the motor 220.

In above-mentioned controlling method, when the remote controller 20 drives the motor 220 to operate (i.e. drive the propeller 230 to rotate) by the motor driving device 30, the remote controller 20 periodically transmits the wireless signal to the motor driving device 30, for example, at a preset frequency of 2.4 GHz. The remote controller 20 is generally carried by the user 80 or attached to the paddle or other marine device for a convenient remote control by the user. The communication repeater module 310 can detect whether a communication failure between the remote controller 20 and the motor driving device 30 (e.g. the wireless connection between the remote controller 20 and the motor driving device 30 is disconnected, or is too weak) is continued for a period of time, or whether the wireless signal transmitted by the remote controller 20 is not received for a certain period of time, thereby determining whether the remote controller 20 is beyond a preset range or has fallen into the water and further determining whether the user 80 has fallen into the water. When the remote controller 20 falls into the water, the wireless signal in the water will attenuate, and the motor driving device 30 will not receive the wireless signal from the remote controller 20. Thus, the motor driving device 30 can determine that the remote controller 20 is in water, and control the motor 220 to power off.

Therefore, when the remote controller 20 (or the user 80) falls into water, the motor driving device 30 of the above-mentioned control system can timely control the motor 220 to power off, thereby avoiding injuries and collisions.

The above-mentioned control system can be used in the underwater propulsion apparatus 10.

It should be noted that, the above embodiments are merely to illustrate the technical solutions of the present disclosure, it is not intended to be limited. Although the preferred examples with reference to the present disclosure have been described in detail, the person skilled in the art should be understood that the present disclosure may be modified or replaced by equivalents, without departing from the spirit and scope of the present disclosure.

What is claimed is:

1. A control system for an underwater propulsion apparatus having a motor comprising:
   a remote controller; and
   a motor driving device, wirelessly communicated with the remote controller, the motor driving device comprising:
      a communication repeater module, the communication repeater module configured for detecting whether a wireless signal is transmitted by the remote controller and for receiving and forwarding the wireless signal to the motor driving module when the remote controller transmits the wireless signal to the communication repeater module;
      a motor driving module, the motor driving module configured for receiving the wireless signal, and outputting a driving signal for driving the motor according to the wireless signal; and
      a battery, wherein the battery is electrically connected to the communication repeater module and the motor driving module respectively, the battery is configured for providing a first voltage for the communication repeater module and providing a second voltage for the motor driving module;
   wherein the remote controller comprises a magnetic field strength detecting unit, the magnetic field strength detecting unit comprises a first magnetic sensor, a sliding rail, a sliding block, and a magnet, the sliding rail defines a sliding slot, the sliding block is slidably connected to the sliding rail through the sliding slot, the magnet is positioned on the sliding block.

2. The control system of claim 1, wherein when the motor driving module ceases receiving the wireless signal from the communication repeater module, the motor driving module controls the motor to shut down.

3. The control system of claim 2, wherein when the remote controller drives the motor to operate by the motor driving device, the remote controller transmits the wireless signal to the motor driving device at a predetermined time interval, the communication repeater module detects whether there is a communication failure between the remote controller and the motor driving device continued for a certain period of time, thereby determining whether the remote controller is beyond a preset range, when the remote controller is beyond the preset range, the motor driving device ceases receiving the wireless signal from the remote controller.

4. The control system of claim 1, wherein the magnetic field strength detecting unit further comprises a second magnetic sensor, the first magnetic sensor and the second magnetic sensor are spaced apart from each other, the sliding rail is positioned between the first magnetic sensor and the second magnetic sensor.

5. The control system of claim 1, wherein the communication repeater module comprises a first single chip microprocessor, a first trigger, and a diode, the motor driving module comprises a second single chip microprocessor and a second trigger, the first single chip microprocessor, the first trigger, the diode, the second trigger, and the second single chip microprocessor are connected in sequence, the first trigger is connected to an anode of the diode, and the second trigger is connected to a cathode of the diode.

6. The control system of claim 1, further comprising a solar charging module, wherein the solar charging module is electrically connected to the battery, the solar charging module is configured for charging the battery by solar energy.

7. The control system of claim 1, wherein the remote controller further comprises a power management unit, the power management unit is configured for controlling the remote controller to power off if the remote controller does not receive a feedback signal of the communication repeater module within a preset time, the power management unit comprises a built-in battery configured for supplying electric power for the remote controller, the built-in battery is capable of being charged by a solar cell panel.

8. The control system of claim 6, wherein each of the battery, the communication repeater module, the motor driving module, and the motor are independently and separately assembled into a respective protective housing or combined in different protective housings.

9. The control system of claim 1, wherein the communication repeater module wirelessly communicating with the remote controller is positioned above the water, and is wired to the motor driving module positioned underwater.

10. An underwater propulsion apparatus comprising:
    a motor; and
    a control system for controlling the motor, the control system comprising:
       a remote controller; and
       a motor driving device, wirelessly communicated with the remote controller, the motor driving device comprising:
          a communication repeater module, the communication repeater module configured for detecting whether a wireless signal is transmitted by the remote controller and for receiving and forwarding the wireless signal to the motor driving module when the remote controller transmits the wireless signal to the communication repeater module;
          a motor driving module, the motor driving module configured for receiving the wireless signal, and outputting a driving signal for driving the motor according to the wireless signal; and
          a battery, wherein the battery is electrically connected to the communication repeater module and the motor driving module respectively, the battery is configured for providing a first voltage for the communication repeater module and providing a second voltage for the motor driving module;
       wherein the remote controller comprises a magnetic field strength detecting unit, the magnetic field strength detecting unit comprises a first magnetic sensor, a sliding rail, a sliding block, and a magnet, the sliding rail defines a sliding slot, the sliding block is slidably connected to the sliding rail through the sliding slot, the magnet is positioned on the sliding block.

11. The underwater propulsion apparatus of claim 10, wherein when the motor driving module ceases receiving the wireless signal from the communication repeater module, the motor driving module controls the motor to shut down.

12. The underwater propulsion apparatus of claim 11, wherein when the remote controller drives the motor to operate by the motor driving device, the remote controller periodically transmits the wireless signal to the motor driving device at a predetermined time interval, the communication repeater module detects whether there is a communication failure between the remote controller and the motor driving device continued for a certain period of time, thereby determining whether the remote controller is beyond a preset range, when the remote controller is beyond the preset range, the motor driving device ceases receiving the wireless signal from the remote controller.

13. The underwater propulsion apparatus of claim 10, wherein the magnetic field strength detecting unit further comprises a second magnetic sensor, the first magnetic sensor and the second magnetic sensor are spaced apart from each other, the sliding rail is positioned between the first magnetic sensor and the second magnetic sensor.

14. The underwater propulsion apparatus of claim 10, wherein the communication repeater module comprises a first single chip microprocessor, a first trigger, and a diode, the motor driving module comprises a second single chip microprocessor and a second trigger, the first single chip microprocessor, the first trigger, the diode, the second trigger, and the second single chip microprocessor are connected in sequence, the first trigger is connected to an anode of the diode, and the second trigger is connected to a cathode of the diode.

15. The underwater propulsion apparatus of claim 10, wherein the control system further comprises a solar charging module, the solar charging module is electrically connected to the battery, the solar charging module is configured for charging the battery by solar energy.

16. The control system of claim 15, wherein the remote controller further comprises a power management unit, the power management unit is configured for controlling the remote controller to power off if the remote controller does not receive a feedback signal of the communication repeater module within a preset time, the power management unit comprises a built-in battery configured for supplying electric power for the remote controller, the built-in battery is capable of being charged by a solar cell panel.

17. The underwater propulsion apparatus of claim 15, wherein each of the battery, the communication repeater module, the motor driving module, and the motor are independently and separately assembled into a respective protective housing or combined in different protective housings.

18. The underwater propulsion apparatus of claim 10, wherein the communication repeater module wirelessly communicating with the remote controller is positioned above the water, and also is wired to the motor driving module positioned underwater.

19. A control method for a motorized underwater propulsion apparatus comprising:
a control system comprising a remote controller; and a motor driving device, wirelessly communicated with the remote controller, the motor driving device comprising a communication repeater module and a motor driving module;
transmitting a wireless signal from the remote controller to the communication repeater module;
detecting whether the wireless signal is transmitted by the remote controller, receiving and forwarding the wireless signal to the motor by the communication repeater module; and
outputting a driving signal for driving the motor from the motor driving module to the motor according to the wireless signal if the communication repeater module does not receive the wireless signal from the remote controller, outputting the driving signal to stop the motor from operating;
wherein the remote controller comprises a magnetic field strength detecting unit, the magnetic field strength detecting unit comprises a first magnetic sensor, a sliding rail, a sliding block, and a magnet, the sliding rail defines a sliding slot, the sliding block is slidably connected to the sliding rail through the sliding slot, the magnet is positioned on the sliding block.

* * * * *